United States Patent [19]

Burley

[11] 4,007,349
[45] Feb. 8, 1977

[54] INDUCTIVE METHOD FOR CUTTING CLOTH

[76] Inventor: John Charles Burley, 47a Southwick St., Southwick, Brighton, Sussex BN4 4TH, England

[22] Filed: Dec. 2, 1974

[21] Appl. No.: 529,000

Related U.S. Application Data

[63] Continuation-in-part of Ser. No. 442,582, Feb. 14, 1974, abandoned.

[30] Foreign Application Priority Data

Feb. 14, 1973  United Kingdom ............... 7166/73

[52] U.S. Cl. ................................. 219/10.43; 83/16; 219/10.49; 219/10.57
[51] Int. Cl.² .......................................... H05B 5/02
[58] Field of Search ........................ 83/15, 16, 171; 219/10.53, 10.49, 10.57, 10.43

[56] References Cited

UNITED STATES PATENTS

| | | | |
|---|---|---|---|
| 1,483,427 | 2/1924 | Gaynor | 219/10.49 |
| 2,374,706 | 5/1945 | Saslaw | 219/10.43 |
| 2,677,747 | 5/1954 | Jaye | 83/16 |
| 3,536,568 | 10/1970 | Rothstein | 219/10.53 X |
| 3,587,377 | 6/1971 | Olson | 83/171 |
| 3,764,767 | 10/1973 | Randolph | 219/10.49 |

FOREIGN PATENTS OR APPLICATIONS 756,447  9/1956  United Kingdom ................. 83/16

*Primary Examiner*—E. A. Goldberg
*Attorney, Agent, or Firm*—Brisebois & Kruger

[57] ABSTRACT

A method and apparatus for cutting out cloth, in the manufacture of clothing for example, is described in which metal strips bent to outline the shapes of the cloth pieces are pressed against the cloth and edges of the strips in contact with the cloth are heated a part at a time by electromagnetic induction using a narrow loop electrode which is scanned along the cloth.

6 Claims, 6 Drawing Figures

INDUCTIVE METHOD FOR CUTTING CLOTH

This application is a continuation-in-part of my prior application Ser. No. 442,582, filed Feb. 14, 1974 now abandoned.

This invention relates to a process and apparatus for converting lengths of material, for example cloth, into smaller pieces, for example garment sections.

The invention relates primarily to a stage in the manufacture of clothing and specifically such garments as suits and overcoats. Normally, templates are employed to define the shape of a section of a garment and to indicate the line of severance from the length of cloth from which the suit or coat is to be cut. Heretofore, the procedure has been to lay a thin template made of cardboard or similar material on the cloth and transfer the shape thereof by marking around the template edge with chalk, this line then being followed by the blades of manually operated cutting shears.

It has been proposed to employ multiple knives in place of cutting shears or laser beams steered along a pre-determined path by computer signals to burn and sever the fibres comprising the woven fabric but the latter method is very complicated and expensive and is still under development.

It is well known to sever cloth by positioning it in contact with a heated linear element in the shape of the outline of the section to be severed. However such an element has a considerable thermal capacity and consequently takes a considerable time to heat up or to cool down. When the cloth has to be carefully positioned on the element before severing the element must of course be cold, or scorching will result. Consequently a considerable time must elapse between successive severing operations to allow for the element to cool down. Moreover, once the cloth has been positioned on the cold element application of heat to the element causes it to heat up only gradually, which may lead to unevenness of cutting and scorching of the cloth.

It is an object of the present invention to overcome the above difficulties at least partially.

The present invention provides a method of severing a portion of a given shape from a piece of cloth by placing the cloth in contact with a linear electrically conductive element bent into the shape of the outline of the portion to be severed and inductively heating successive small sections of the element to sever the cloth in contact therewith until the portion is completely severed from the piece of cloth.

Preferably the element is a thin metal band, strip, ribbon or wire, that has been shaped by bending to fit a template of the portion to be severed. The template may be removed after the element has been correctly shaped and positioned, although if it is of electrically insulating material which would not be damaged by the heating involved it could be left in place.

Preferably only an edge of the element which is in contact with the cloth is raised to a temperature sufficient to sever the cloth by the induced current. This may be achieved by tapering the element at this edge, thus ensuring a higher temperature there for a given amount of induced energy, particularly if the energising electrode is on the side of the cloth remote from the element.

The process of the invention is especially applicable to woolen fabrics, including fabrics made of a mixture of wool and synthetic materials, but is also applicable to the severing of of sheet materials other than cloth, provided the materials behave in a similar way when heated.

The present invention further provides an apparatus for severing a portion of given shape from a piece of cloth which comprises an electrically conductive element located on a working surface and adapted to contact the cloth only along the periphery of the given shape; means for supporting the cloth in contact with the element; an oscillatory signal generator; an induction electrode connected to the generator, and capable of being moved relative to the element while so powered so as to pass close to the whole of an area of the working surface within which the given shape can lie, the area overlapping the whole of the element, the electrode being arranged to heat only those sections of the element that come nearest to it.

One form of the apparatus to enable the various functions to be performed will now be described in more detail, by way of example only, with reference to the accompanying drawings, in which.

Figure 1:
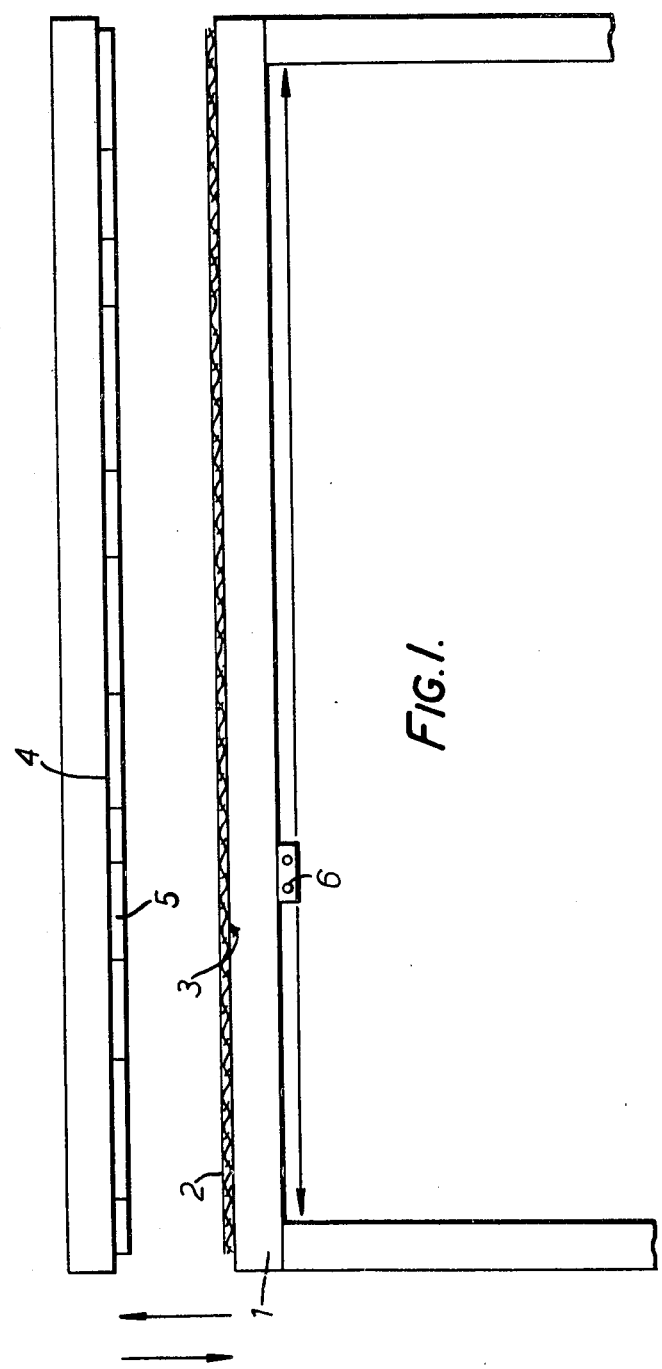
FIG. 1 shows one form of apparatus, according to the invention.

FIG. 1 shows a side view of one form of apparatus according to the invention having a stationary bench 1, a piece of cloth 2 to be cut being laid on the upper surface 3, of the bench 1; a mat of, for example, glass fibre may be provided for the cloth 2 to rest on. Above the bench 1 is located a working surface 4, which is capable of being lowered towards or raised from the surface 3. Secured to the working surface 4 is an array 5 of elements for cutting out sections of cloth, as will be described, and the working surface 4 can be lowered until the elements 5 are in contact with the cloth, exerting a slight pressure thereon.

Each of the elements 5 is in the form of an elongate conductor bent into the shape of the outline of a piece of cloth to be cut and securely located on the working surface 4, having being initially formed around templates. The elements 5 are arranged to as to match the pattern of the cloth and give an economical use of it. The templates may be removed after the elements 5 have been formed or if they are of a suitable material and thickness they may be left in the elements.

The elements 5 may be located on the working surface 4 by any of a number of methods, for example by spotwelding it to angle brackets screwed to the working surface 4. However, magnetic pads may advantageously be used to secure the elements 5 on the working surface 4. When magnetic pads are employed the elements 5 may be slid on the working surface 4 while still being retained thereon. This freedom of lateral movement, which is aided by the fact that no electrical connections have to be made to the elements 5, permits a great deal of flexibility in the initial setting up of the element array, and makes for easy adjustment thereafter.

If desired, spring mountings can be provided for the elements 5, either on the magnetic pads or other means of attachment to the working surface 4, or by providing one or more sub-frames spring mounted on that surface, to which the elements 5 are secured. The springs should be chosen to provide the requisite pressure on the cloth when the working surface 4 is in a predetermined operative position. Typically this pressure may be between one eighth and one quarter of an imperial pound weight per inch of the elements length.

Figure 2:
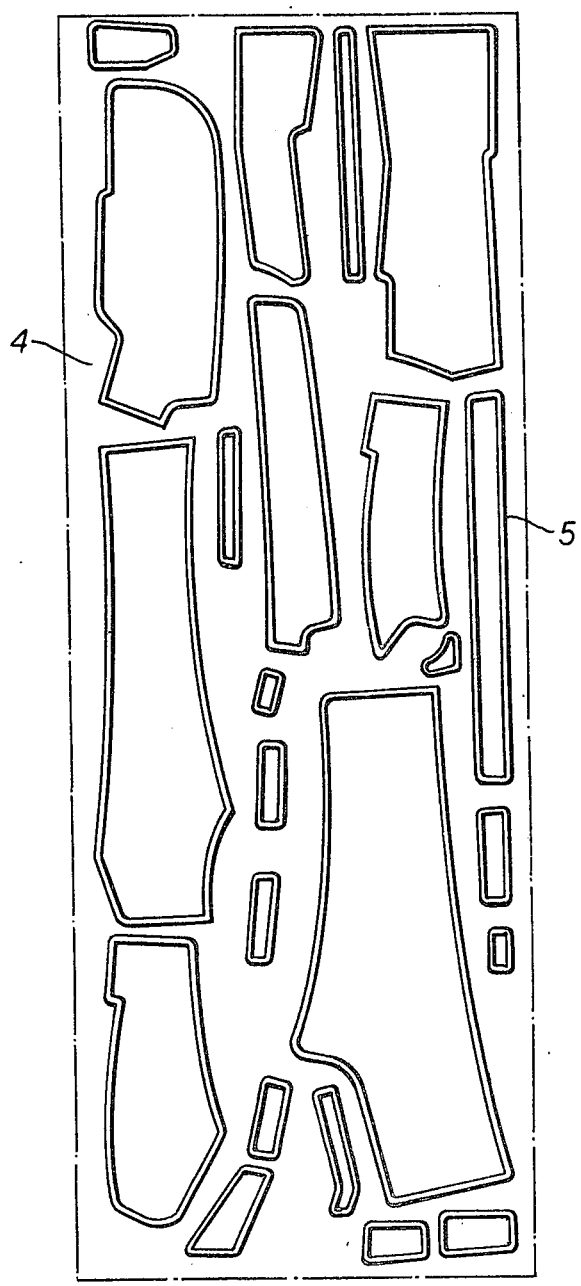
FIG. 2 shows a plan view of a typical element array for producing cloth sections of a suit.

FIG. 2 shows a plan view of a typical element array 5. Here the elements 5, located on the working surface 4 are in the form of the outlines of a complete set of garment sections. Each separate section is formed and located on the surface 4.

Figure 3:
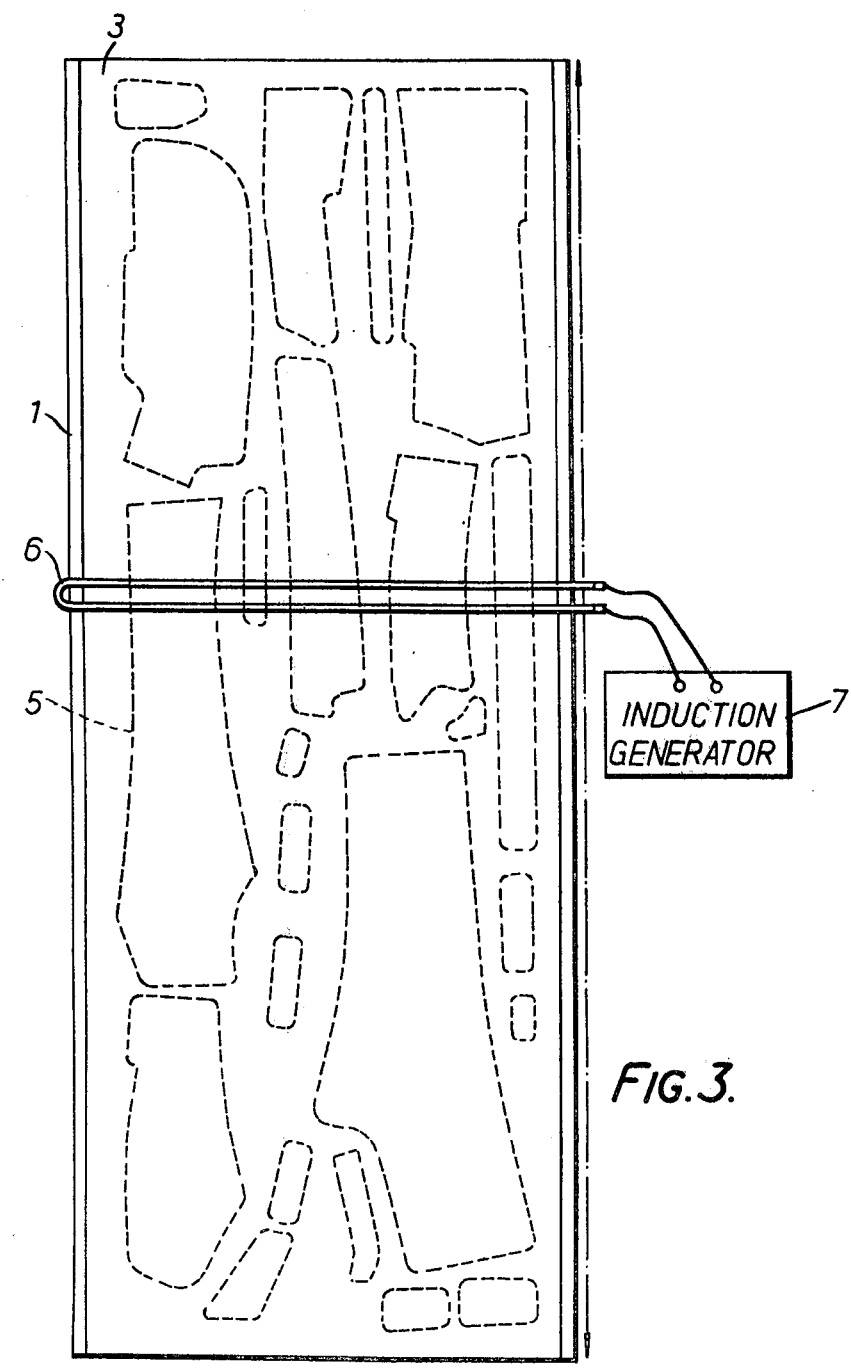
FIG. 3 shows one suitable form of induction electrode in relation to the element array of FIG. 2.

FIG. 3 shows a plan view of the underside of the supporting surface 3. The positions of the elements 5 on the upper side of the supporting surface 3 are shown dotted. Mounted underneath the supporting surface 3, so as to be movable along the length of the supporting surface as indicated by the arrow, is the induction electrode 6, connected to an induction oscillatory signal generator 7. The induction electrode 6 is orientated across the lower face of supporting surface 3, perpendicularly to the length of that surface. By moving the induction electrode along the length of the supporting surface it is thus brought into close proximity with all of the elements 5.

The induction electrode 6 only energises those of the elements 5 with which it is in close proximity at the time. Consequently in the arrangement just described the induction generator 7 needs to supply a much smaller amount of power than if it had to heat all of the elements 5 at once.

For example, an induction generator power of between 4.5 and 6.0 kW can be used, in which case the electrode can be moved relative to the elements at such a speed as to sever the whole array of suit sections shown in FIG. 2 in about 1 minute. The induction electrode may be formed from, for example, copper rod or tubing and may be water-cooled.

In operation the piece of cloth from which portions are to be severed is laid on the supporting surface 3, and the working surface 4, with its pre-arranged element array 5, is lowered to contact the cloth with a slight pressure. The powered induction electrode is then energised moved gradually along the length of the surface 3.

As the induction electrode moves into a position vertically below a part of the elements 5, the heat induced in that section of the element causes the temperature of its edge to increase rapidly. Adjacent sections do not receive such a powerful induction field from the electrode, and consequently are not significantly heated. Moreover the small thermal capacity of the heated edges of the elements means that, when the electrode has moved on so that the source of energisation has been removed, the edges quickly cool down. Thus the effect is that the small hot regions move down the length of the edges of the elements as the electrode moves underneath, and the rest of the element remains relatively cool. Where the shape and layout of the elements is such that more than one element lies above the line of the electrode at any one time, all such elements will of course be energised. Typically the edges of the electrodes are raised to a black heat temperature of roughly 380° F. The effect of this is rapidly to sever the cloth cleanly and without scorching.

When one piece of cloth has been severed into portions as described above, the fact that the elements will be cool very soon after the passage of the electrode means that another piece of cloth can be placed on the bench 1 and the elements 5 brought down for the next cutting operation without fear of scorching.

By providing, as shown in FIG. 2, the element 5 in the form of a complete set of garment sections, such a complete set can be severed in one operation.

The cut achieved in this way on a piece of cloth is as good as that achieved by manually cutting with shears. Indeed the number of loose threads left at the edge of the cloth is greatly reduced. This may be due to a self-sealing action produced by the heating of the fibres of the cloth.

Figure 4:
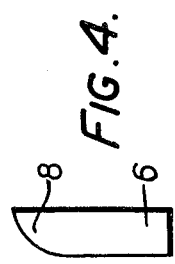
FIG. 4 shows a cross-sectional view of one form of conductor suitable for constructing the elements.

It is preferable that only the edges of the elements actually in contact with the cloth have their temperatures appreciably raised. By thus keeping small the effective thermal capacity of the heated parts, both the heating up and cooling down are speeded up. FIG. 4 shows in cross-section an element 5 with a bevelled upper edge 8. The reduced thickness of the upper edges tends to concentrate the heating in the upper edges.

The top edges of the elements may also be provided with a P.T.F.E (polytetrafluoroethylene) coating to prevent burnt or melted fibres from sticking to the elements.

Figure 5:
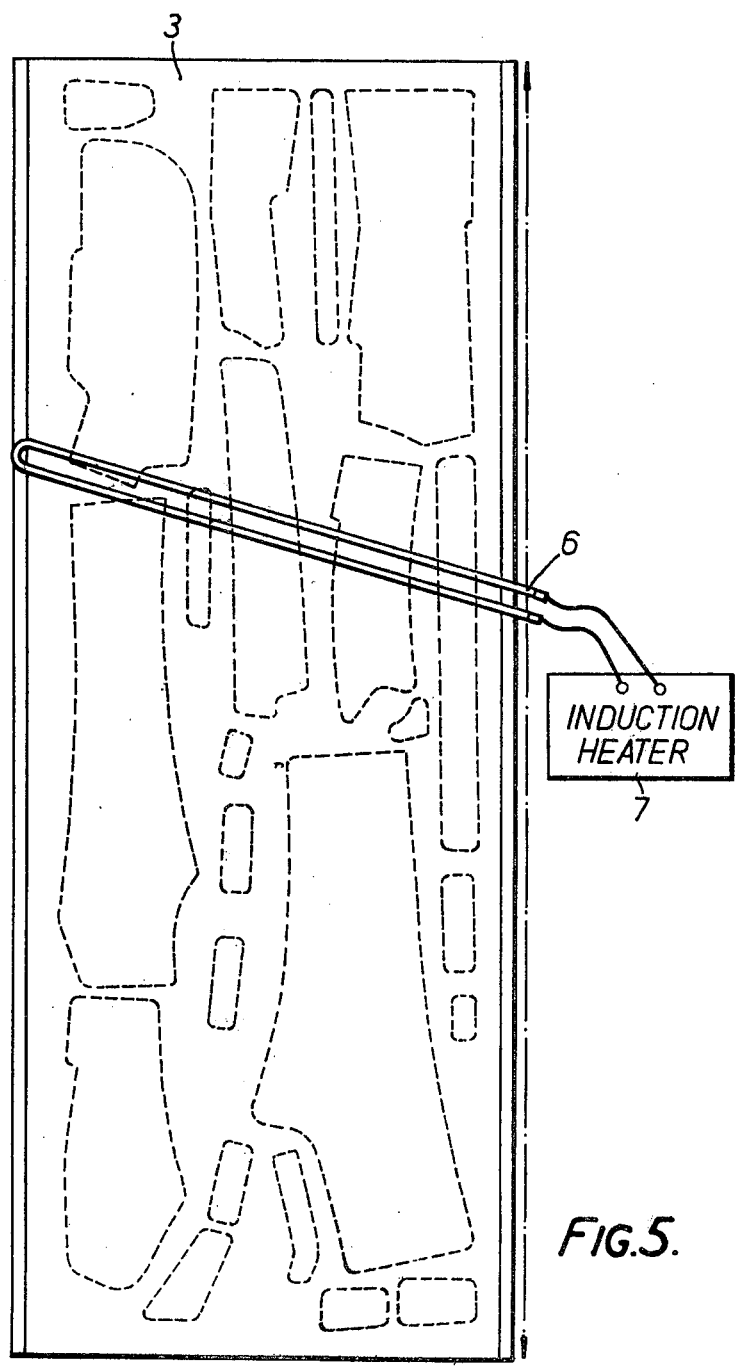
FIG. 5 shows a variation of the arrangement of FIG. 3.

An alternative to the arrangement of FIG. 3 is shown in FIG. 5. Here the induction element 6 is orientated at an angle to the ends of the bench, which angle 1 may be variable. This arrangement allows the avoidance of situations in which the shapes of the elements 5 and their layout would cause too great a length of the elements 5 to lie directly above the electrode 6 at a certain position, for example when a straight length of an element 5 would lie parallel to the electrode 6. Such a situation might lead to undesirable overloading on the induction heating system or unsatisfactory heating of the element. By suitably orientating the electrode 6, such situations can be avoided.

Figure 6:
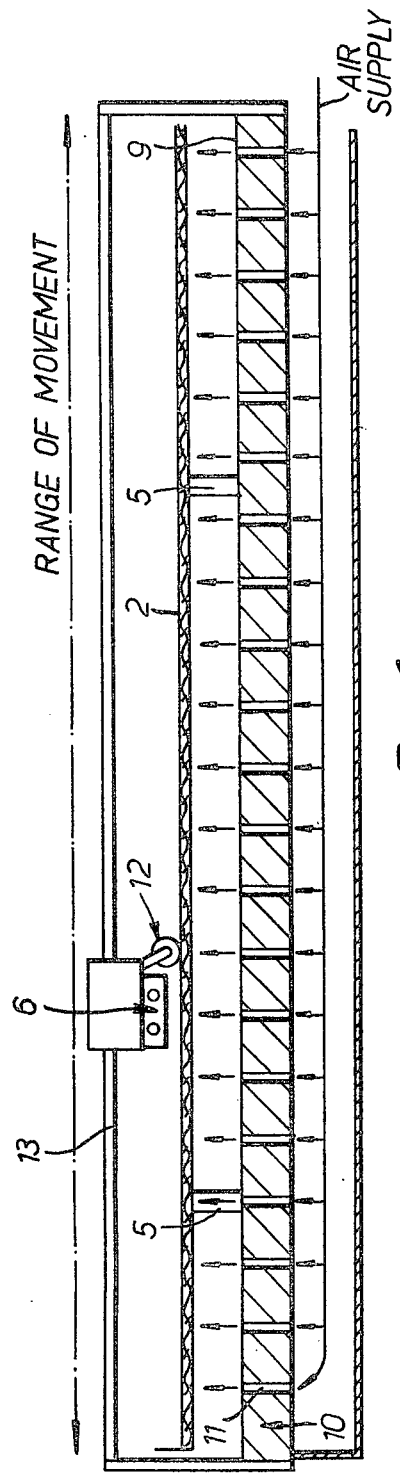
FIG. 6 shows another form of apparatus according to the invention.

Another form that apparatus according to the present invention can take is shown in FIG. 6. Here a working surface 9 forms the top surface of a platform 10, the elements 5 being located on the surface 9. The elements may be formed and located in any of the ways described above. In operation the piece of cloth 2 from which sections are to be severed rests on the upper edges of the elements 5 supported by a cushion of air blown up against the lower face of the cloth 2 supplied along apertures 11 through the platform 10. The air is impelled through the apertures 11, via suitable ducting by a suitable fan unit neither of which are shown, the flow of air being adjusted so that the piece of cloth 2 is supported uniformly between the elements 5 without sagging down appreciably or billowing up. The flow of air would be adjustable to allow for the different weights and porosities of different cloths.

The induction electrode 6 is supported above the platform 10 so as to lie generally across it. As above, the angle that the electrode makes with the width of the platform 10 may be adjustable. The platform 10 is supported so as to be movable, parallel to its length, so that the whole area of the working surface—within which the element 5. A springloaded silicone rubber-faced small diameter roller 12 disposed alongside the electrode 6 and slightly to its rear in relation to the direction of travel of the electrode 6 over the fabric during cutting may be provided to bear with slight pressure on the cloth to maintain it flat and in contact with the element during cutting.

In operation the piece of cloth 2 to be severed is laid on the elements 5 on the platform 10 while it is clear of the electrode 5. When the piece of cloth has been properly laid out and the supporting air cushion adjusted, the electrode 6 is energised and passed over the cloth 2, preferably by motorised means.

When the electrode 6 has passed over the entire length of cloth 2 the cut out portions can be taken away. The electrode 6 is then returned to its initial position and a new piece of cloth laid on the elements.

The elements can be secured on the platform 10 in either of the ways described above and mounting springs may be used to allow a slight movement of the elements under the pressure of the roller 12 so as to accommodate variations in the heights of the elements.

I claim:

1. A method of preparing garment sections for sewing together to make a garment such as a suit or coat, the method comprising the steps of:
   taking an array of electrically conductive strip elements arranged with one edge of each element lying in a common plane, each of said elements being bent into the shape of a respective garment section required in making up the garment,
   positioning adjacent the said one edges of the elements a piece of cloth of predetermined length and width at least equal to the length and width of said array,
   positioning an elongate induction heating electrode adjacent the side of said cloth remote the array, said electrode extending across the width of said array,
   supplying high frequency electrical energy to said electrode to heat the strip element edges closest thereto to a temperature sufficient to sever the cloth, and
   causing relative movement of said array and said electrode whilst maintaining the relative positions of said cloth and said array, and whilst contacting the cloth with the said heated edges to thereby sever garment sections progressively from the said piece of cloth as said relative movement is carried out.

2. A method as set forth in claim 1, wherein said cloth is supported by air jets during severing said garment sections.

3. A method as set forth in claim 1, wherein the said one edges of the elements are tapered.

4. A method as set forth in claim 1, wherein the electrical energy supplied to said electrical lies in the range 4.5 to 6.0 kW.

5. A method as set forth in claim 4, wherein said one edges are heated to about 380° F and the time taken to carry out said relative movement is about 1 minute.

6. A method as set forth in claim 2, wherein said air jets are directed towards the side of the cloth adjacent said strip elements.

* * * * *